United States Patent
Zhang et al.

(10) Patent No.: US 10,607,243 B2
(45) Date of Patent: Mar. 31, 2020

(54) USER BEHAVIOR ANALYSIS METHOD AND DEVICE AS WELL AS NON-TRANSITORY COMPUTER-READABLE MEDIUM

(71) Applicants: Guanglei Zhang, Beijing (CN); Jichuan Zheng, Beijing (CN); Bin Dong, Beijing (CN); Yixuan Tong, Beijing (CN)

(72) Inventors: Guanglei Zhang, Beijing (CN); Jichuan Zheng, Beijing (CN); Bin Dong, Beijing (CN); Yixuan Tong, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 351 days.

(21) Appl. No.: 15/658,534

(22) Filed: Jul. 25, 2017

(65) Prior Publication Data

US 2018/0047036 A1 Feb. 15, 2018

(30) Foreign Application Priority Data

Aug. 11, 2016 (CN) .......................... 2016 1 0657788

(51) Int. Cl.
*G06Q 30/00* (2012.01)
*G06Q 30/02* (2012.01)
(Continued)

(52) U.S. Cl.
CPC ......... *G06Q 30/0201* (2013.01); *G06N 5/022* (2013.01); *G06Q 30/0631* (2013.01); *G06N 20/00* (2019.01)

(58) Field of Classification Search
None
See application file for complete search history.

(56) References Cited

U.S. PATENT DOCUMENTS 7,657,907 B2 2/2010 Fennan et al.
7,904,448 B2 3/2011 Chung et al.
(Continued)

FOREIGN PATENT DOCUMENTS

| JP | 2007163472 A | * | 6/2007 | ............. G01C 21/00 |
| JP | 2017215634 A | * | 12/2017 | ............. G06Q 50/22 |
| JP | 2018010378 A | * | 1/2018 | ............. G06Q 50/10 |

OTHER PUBLICATIONS

Guo et al. A Novel Contextual Information Recommendation Model and Its Application in e-Commerce Customer Satisfaction Management. (Apr. 7, 2015). Retrieved online Jan. 23, 2020. https://www.hindawi.com/journals/ddns/2015/691781/ (Year: 2015).*

(Continued)

*Primary Examiner* — James A Reagan
(74) *Attorney, Agent, or Firm* — IPUSA, PLLC

(57) ABSTRACT

User behavior analysis method and device are disclosed. The method comprises: obtaining a behavior record of users regarding commodities; acquiring, by determining a commodity feature vector in a predetermined commodity feature space of each of the commodities, a commodity feature matrix consisting of the commodity feature vectors of the commodities; for each of the users, calculating, based on a sub behavior record of the corresponding user regarding each of the commodities, a preference score of the corresponding user regarding each of the commodities, so as to get a score matrix composed of the preference scores of the users regarding the commodities; and for each of the users, determining, based on a regularized least squares based solution of a difference function of the score matrix and a prediction matrix, a user feature vector of the corresponding user in its related predetermined commodity feature space.

12 Claims, 8 Drawing Sheets

(51) Int. Cl.
*G06N 5/02* (2006.01)
*G06Q 30/06* (2012.01)
*G06N 20/00* (2019.01)

(56) References Cited

U.S. PATENT DOCUMENTS

| | | | | |
|---|---|---|---|---|
| 9,536,072 | B2* | 1/2017 | Guedalia | G06F 21/316 |
| 2014/0250048 | A1* | 9/2014 | Lospinoso | G06N 5/048 |
| | | | | 706/52 |
| 2016/0104486 | A1* | 4/2016 | Penilla | B60R 16/0373 |
| | | | | 704/232 |
| 2016/0170996 | A1* | 6/2016 | Frank | G06F 16/24578 |
| | | | | 707/748 |

OTHER PUBLICATIONS

Centre for European Policy Studies Brussels. Price Formation in Commodities Markets: Financialisation and Beyond. (Sep. 2013). Retrieved online Jan. 23, 2020. https://www.ceps.eu/system/files/commodtfr.pdf (Year: 2013).*

Ben-Akiva et al. Foundations of Stated Preference Elicitation Consumer Choice Behavior, Measurement of Consumer Welfare, and Choice-Based Conjoint Analysis. (Jul. 4, 2015). Retrieved online Jan. 23, 2020. https://pdfs.semanticscholar.org/1c9a/e176dda6b0027805396ae1e0bc442d8665c2.pdf (Year: 2015).*

* cited by examiner

FIG.5

| COMMODITY FEATURE SPACE | ALL POSSIBLE COMMODITY FEATURE VECTORS OF CAR | | | |
|---|---|---|---|---|
| COLOR: WHITE | 1 | 1 | 1 | 1 |
| COLOR: BLACK | 0 | 0 | 0 | 0 |
| SPEED (km/h): <100 | 1 | 0 | 0 | 0 |
| SPEED (km/h): 100-150 | 0 | 1 | 0 | 0 |
| SPEED (km/h): 150-200 | 0 | 0 | 1 | 0 |
| SPEED (km/h): >200 | 0 | 0 | 0 | 1 |
| BRAND: BRAND 1 | 1 | 1 | 1 | 1 |
| BRAND: BRAND 2 | 0 | 0 | 0 | 0 |

USER BEHAVIOR ANALYSIS METHOD AND DEVICE AS WELL AS NON-TRANSITORY COMPUTER-READABLE MEDIUM

BACKGROUND OF THE DISCLOSURE

1. Field of the Disclosure

The present disclosure relates to the field of information processing, more particularly relates to a user behavior analysis method, a user behavior analysis device, and a non-transitory computer-readable medium.

2. Description of the Related Art

With the continuous improvement and development of E-commerce platforms, the market share of online goods becomes larger and larger. Although the abundant online goods bring convenience to people's lives and business activities, they also entail disturbance and confusion when the people select commodities. As such, in order to recommend users their favorite items, personalized commodity recommendation has gotten noticed by the relevant researchers.

The personalized commodity recommendation needs to get the relevant information of the users so as to provide different kinds of goods for different types of users or adopt different marketing strategies in regard to the same item. In general, when the users access (visit) the online services, visitor logs containing, for example, visited homepages, submitted registration information, input key words, and posted comments may be stored in a database for analyzing user behaviors online or offline.

In conventional techniques, there are many approaches for analyzing the user behaviors. However, these kinds of approaches usually perform analysis on the features of commodities so as to acquire customers according to the features of the commodities. Since the demands of users are not taken into account, by using these kinds of approaches, it is impossible to find the items that the users really want. In other words, the accuracy of commodities recommended by utilizing these kinds of approaches is not high enough to meet the demands of the users.

SUMMARY OF THE DISCLOSURE

In light of the above, the present disclosure provides a user behavior analysis method and device by which it is possible to more accurately determine the points of interest of the users so as to improve the accuracy of commodities recommended for them.

According to a first aspect of the present disclosure, a user behavior analysis method is provided. The user behavior analysis method includes obtaining a behavior record of plural (i.e., multiple or a plurality of; the same shall apply hereinafter) users regarding plural commodities; acquiring, by determining a commodity feature vector in a predetermined commodity feature space of each of the plural commodities, a commodity feature matrix consisting of the commodity feature vectors of the plural commodities; for each of the plural users, calculating, based on a sub behavior record of the corresponding user regarding each of the plural commodities, a preference score of the corresponding user regarding each of the plural commodities, so as to get a score matrix composed of the preference scores of the plural users regarding the plural commodities; and for each of the plural users, determining, based on a regularized least squares based solution of a difference function of the score matrix and a prediction matrix, a user feature vector of the corresponding user in the corresponding predetermined commodity feature space, the prediction matrix being an inner product of a user feature matrix and the commodity feature matrix, the user feature matrix being made up of the user feature vectors of the plural users.

According to a second aspect of the present disclosure, a user behavior analysis device is provided. The user behavior analysis device includes a behavior record obtainment part configured to obtain a behavior record of plural users regarding plural commodities; a commodity feature matrix obtainment part configured to acquire, by determining a commodity feature vector in a predetermined commodity feature space of each of the plural commodities, a commodity feature matrix consisting of the commodity feature vectors of the plural commodities; a score matrix obtainment part configured to, for each of the plural users, calculate, based on a sub behavior record of the corresponding user regarding each of the plural commodities, a preference score of the corresponding user regarding each of the plural commodities, so as to get a score matrix composed of the preference scores of the plural users regarding the plural commodities; and a user feature vector determination part configured to, for each of the plural users, determine, based on a regularized least squares based solution of a difference function of the score matrix and a prediction matrix, a user feature vector of the corresponding user in the corresponding predetermined commodity feature space, the prediction matrix being an inner product of a user feature matrix and the commodity feature matrix, the user feature matrix being made up of the user feature vectors of the plural users.

According to a third aspect of the present disclosure, another user behavior analysis device is provided. The other user behavior analysis device includes a network interface unit, a processor, an input unit, a storage unit, and a display unit which are connected via a bus. The network interface unit is configured to connect to a network. The input unit is configured to receive instructions, and send the instructions to the processor. The storage unit is configured to store a system program and an application program as well as intermediate data during a calculation process of the processor. The display unit is configured to display results obtained by the processor. The processor is configured to conduct, by executing the application program, the user behavior analysis method described above.

According to a fourth aspect of the present disclosure, a non-transitory computer-readable medium is provided, the non-transitory computer-readable medium having computer-executable instructions for execution by a processing system, in which, the computer-executable instructions, when executed, cause the processing system to carry out the user behavior analysis method described above.

Therefore, it may be understood according to the above that the present disclosure provides a method and device for calculating the preference degrees of the plural users regarding the respective commodity features of each of the plural commodities on the basis of the preference scores of the plural users concerning the plural commodities and the distribution of the commodity features of the plural commodities. The related computational complexity is low, and the computed result may be used to intuitively determine the points of interest of the plural users, so that it is possible to recommend commodities suitable for the plural users. Furthermore, the preference scores of the plural users with respect to the plural commodities are obtained based on the behavior record of the plural users in regards to the plural commodities so that the preference scores obtained in this way are more objective and reliable. Moreover, by employing a regularized least squares based incremental update approach to perform incremental update on the user feature matrix, it is possible to reduce the calculation amount when maintaining the user feature matrix. In addition, when the values of elements in at least one commodity feature vector are missing, an approach of estimating the values of the elements is proposed; as a result, on the grounds of the at least one commodity feature vector in which the missing values of the element are made up based on the estimation and the other commodity feature vectors, it is also possible to obtain the user feature vectors.

BRIEF DESCRIPTION OF THE DRAWINGS

FIG. 5 illustrates all possible commodity feature vectors obtained when making up the missing values of the elements in the exemplary commodity feature vector illustrated in FIG. 4;

DETAILED DESCRIPTION OF THE PREFERRED EMBODIMENTS

In order to let those skilled in the art better understand the present disclosure, hereinafter, the embodiments of the present disclosure will be concretely described with reference to the drawings. However it should be noted that the same symbols, which are in the specification and the drawings, stand for constructional elements having basically the same function and structure, and repeated explanations for the constructional elements are omitted.

First Embodiment

A user behavior analysis method is given in this embodiment.

Figure 1:
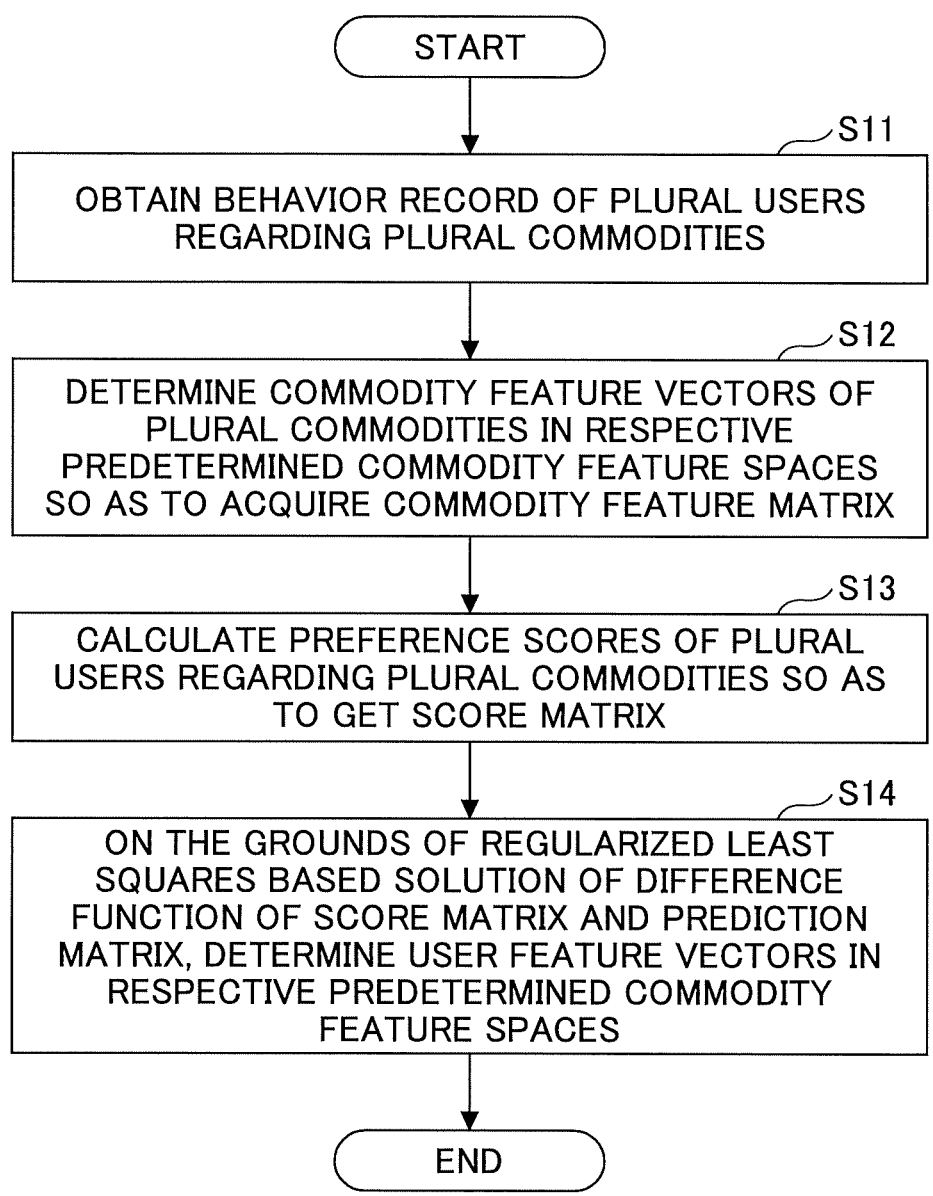
FIG. 1 is a flowchart of a user behavior analysis method according to a first embodiment of the present disclosure.

FIG. 1 is a flowchart of the user behavior analysis method according to this embodiment.

As presented in FIG. 1, in STEP S11, a behavior record of plural users (different users) with respect to plural commodities (different commodities) are acquired.

In this embodiment, the plural commodities generally indicate products or services in which the users may be interested, for example, physical items, virtual goods (such as news, music, and videos), or online or offline services (such as catering services, travel services, and consulting services). Furthermore, it is assumed that there are M users and N commodities.

In actual applications, it is possible to collect the behavior record of the plural users regarding the plural commodities by various network platforms or third parties. The behavior record may include information such as a user ID, a behavior occurrence time, a behavior type, a commodity ID (also called a "product ID"), a behavior occurrence place, and so on. The behavior type may contain clicking and browsing, bookmarking and paying attention, adding to a cart, purchasing, posting a question or comment, etc. The behavior occurrence place may be a physical place, or may be a virtual place such as a visited web site, a utilized browser, operating system, and hardware type, etc.

As an example, in this embodiment, a complete behavior record includes a behavior occurrence time, a behavior occurrence place, a user ID, a product ID, and a behavior type, as set forth in Table 1. However, the present disclosure is not limited to this.

TABLE 1

| Time | Place | User ID | Product ID | Type |
| --- | --- | --- | --- | --- |
| 2015 Nov. 15 | Beijing | 34212 | 1247 | Browsing |
| 2015 Nov. 16 | Shanghai | 12517 | 4849 | Purchasing |
| ... | ... | ... | ... | ... |

Here, in Table 1, Time, Place, and Type refer to the behavior occurrence time, the behavior occurrence place, and behavior type, respectively.

Referring to FIG. 1 again; in STEP S12, by determining a commodity feature vector in a predetermined commodity feature space of each of the plural commodities, a commodity feature matrix consisting of the commodity feature vectors of the plural commodities is obtained.

In this embodiment, each of the plural commodities has commodity features such as color, a brand, a place of production, and so on. In order to conveniently describe the commodity features of each of the plural commodities, the commodity feature matrix consisting of the commodity feature vector of each of the plural commodities is utilized. The commodity feature vector of each of the plural commodities is used to indicate whether this commodity matches a binary vector pertaining to the commodity features in the corresponding predetermined commodity feature space. Here, if it is assumed that each of the predetermined commodity feature spaces has S commodity features, then the corresponding commodity feature vector is a column vector with S elements, so the commodity feature matrix of N commodities is a S*N matrix.

In other words, each of the predetermined commodity feature spaces includes plural commodity features which are predetermined and arranged in a predetermined order. A possible arrangement manner is determining, regarding each of the plural commodities, its commodity features, and then, combining its commodity features so as to form a commodity feature space. Of course, the present disclosure is not limited ti this. It is also possible to create a commodity feature space on the grounds of various commodity features, for example, those different from the commodity features that the plural commodities have.

In this step, for each of the plural commodities, the commodity feature vector of this commodity is generated on the basis of the feature values corresponding to the commodity features of this commodity in the corresponding predetermined commodity feature space. The feature values pertaining to each of the plural commodities are binary data indicating whether this commodity matches the corresponding commodity features. After that, the commodity feature vectors corresponding to the plural commodities are used to form the commodity feature matrix.

In particular, it is possible to collect as many commodity features of a commodity as possible by any network platform or third party, for example, specification features, functional characteristics, and reputations, so as to describe the commodity as perfectly as possible. If some pieces of the commodity information do not exist or are uncertain, then they may be taken from plural data sources by comparison and determination so as to improve the completeness and accuracy of the commodity information.

For example, as for a commodity A, if its reputations do not exist at its commodity information in website 1, then it is possible to obtain the reputations about this commodity from websites 2 and 3, and then, choose best ones therefrom, so as to make up the missing part of the commodity information of this commodity.

In this embodiment, the user behavior record may include but is not limited to the behavior occurrence time, the behavior occurrence place, the user ID, the product ID, and the behavior type, as described in Table 1. In actual applications, a database may be built on the basis of the commodity features of the plural commodities. In this step, by taking advantage of the product ID of each of the plural commodities, it is possible to get the commodity features pertaining to this commodity from the database.

Regarding the commodity features of each of the plural commodities, it may be further extended so as to create a commodity feature vector. Each of the commodity features of a commodity may consist of a commodity feature and its corresponding value. In the commodity feature vector of the commodity, each element (i.e., the feature value of each commodity feature) is a binary element; that is, the value of each element is zero or one. In other words, the commodity feature vector of the commodity is a binary vector. The value of each element therein is used to indicate whether the commodity matches the commodity feature corresponding to this element. For instance, the value of an element therein may be defined as follows. If the value is one, that means the commodity matches the commodity feature corresponding to the element, and if the value is zero, that means the commodity does not match the commodity feature corresponding to the element; of course, vice versa.

As an example, it is supposed that one of the plural commodities is a car, its color is white, its brand is brand 1, and its maximum speed is 280 km/h. According to analysis, the car has three features, i.e., a color feature, a brand feature, and a speed feature. After that, the three features of the car may be extended. For example, the color feature may include white, black, etc., so it is possible to obtain plural commodity features such as a commodity feature "White Color", a commodity feature "Black Color", and so forth. Since the car is white, in its commodity feature vector, the feature value of the commodity feature "White Color" is one, and the feature values corresponding to the other color related commodity features are zero. In a similar way, it is also possible to extend the brand feature and the speed feature.

Figure 2:
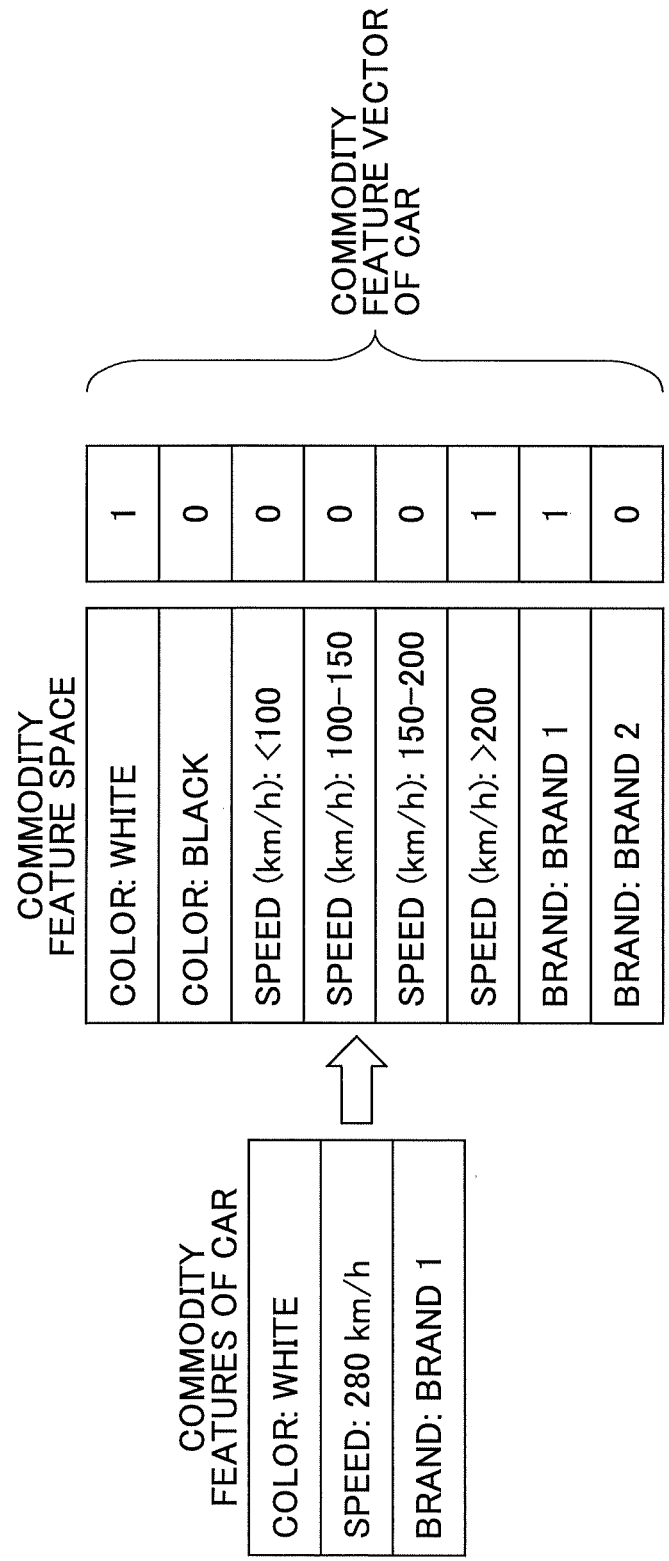
FIG. 2 illustrates an exemplary process of generating a commodity feature vector in the first embodiment of the present disclosure.

Additionally, in this example, the speed of the car is a continuous variable. In order to avoid that the number of the dimensions of the commodity feature vector of the car is too large, interval division may be conducted with respect to the continuous variable when extending the speed feature. The lengths and number of the divided intervals may be decided arbitrarily. For instance, as presented in FIG. 2, the maximum speed in the commodity feature space of a car is divided into four intervals, and the feature value of the element in the commodity feature vector of the car, corresponding to the commodity feature "Maximum Speed (km/h) Greater Than 200" is one. Here it should be noted that FIG. 2 illustrates an exemplary process of generating the commodity feature vector of the car. In FIG. 2, the commodity feature vector of the car corresponds to the commodity feature space of the car. After carrying out this kind of extension, it is possible to obtain the commodity feature vector of the car, as shown in FIG. 2.

Aside from this, when extending the commodity features of a commodity, it is also possible to perform split or combination on the commodity features so as to gain plural hidden commodity features of the commodity.

For example, in FIG. 2, the brand of the car is brand 1, and the maximum speed of the car is 280 km/h. On the basis this, it is possible to surmise that a hidden commodity feature of the car is "Luxury Type", and another hidden commodity feature of the car is "High Engine Speed". In this way, the relevant commodity feature space may be further extended.

As a result, for each of the plural commodities, it is possible to obtain the commodity feature vector corresponding to this commodity in the same manner, so that the commodity feature matrix may be begotten on the grounds of the commodity feature vectors of the plural commodities.

Referring again to FIG. 1; In STEP S13, for each of the plural users, on the basis of a sub behavior record of this user with respect to the same commodity (i.e., each of the plural commodities), the preference score of this user regarding the same commodity is calculated, so that a score matrix is acquired which is composed of the preference scores of the plural users regarding the plural commodities.

In this embodiment, it is possible to define a range of commodities in advance which is called a "universal commodity set" here. The plural commodities are regarded as the universal commodity set in which each commodity may be accessed by one or more of the plural users.

When calculating the score matrix, it is possible to determine, based on the whole behavior history or a part of the whole history during a predetermined time period (i.e., the sub behavior record) of each of the plural users regarding a commodity, the preference degree of this user concerning the commodity, and the comprehensive influences of plural factors relating to the user behaviors on the preference scores regarding the commodity may also be taken into account. Here it should be noted that the sub behavior record of each of the plural users may be acquired from the behavior record (i.e., a kind of database) by a well-known database operation.

In what follows, some preference score calculation approaches which may be adopted in this embodiment will be introduced.

(Approach 1)

For each of the plural users, the sub behavior record of this user in regard to the same commodity is analyzed so as to gain the behavior occurrence time, the behavior type, and the behavior occurrence place of each behavior of the same user with respect to the same commodity. And then, on the grounds of the behavior occurrence time, the behavior type, and the behavior occurrence place of each behavior of the same user regarding the same commodity, the scores pertaining to the respective behaviors are calculated and summed up, so as to acquire the preference score of the same user about the same commodity. Here, when calculating the preference score of the same user regarding the same commodity, the behavior occurrence time, the behavior type, and the behavior occurrence place of each behavior of the same user have a weight, respectively, and the weight (also called a "time weight") of the behavior occurrence time negatively correlates to the interval between the behavior occurrence time and a predetermined reference time which may be any time after the behavior record is obtained in STEP S11 of FIG. 1, for example, the current time.

A formula that may be adopted to calculate the preference score of each of the plural users regarding the same commodity in this approach is as follows.

$$r_{ij} = \sum_{k \in K_{ij}} w(t_k) \cdot w(l_k) \cdot w(b_k) \quad (1)$$

Here, $r_{ij}$ refers to the preference score of the i-th user concerning the j-th commodity; $K_{ij}$ indicates the behavior set of the i-th user regarding the j-th commodity; k denotes the k-th behavior of the i-th user about the j-th commodity; $t_k$, $l_k$, and $b_k$ are indicative of the behavior occurrence time, the behavior type, and the behavior occurrence place of the k-th behavior, respectively; and $w(t_k)$, $w(l_k)$, and $w(b_k)$ present the weights of the behavior occurrence time, the behavior type, and the behavior occurrence place of the k-th behavior, respectively. Here it should be noted that $w(l_k)$ and $w(b_k)$ may be set according to empirical or predetermine values, respectively.

In particular, the time weight $w(t_k)$ of the behavior occurrence time of the k-th behavior usually decreases with time. That is, the closer a behavior is to the current time, the higher the time weight of the behavior occurrence time it has is. It is possible to utilize the following formula to calculate the time weight $w(t_k)$.

$$w(t_k) = \lambda^{t_0 - t_k} \quad (2)$$

Here, $t_k$ represents the occurrence time of the k-th behavior; $t_0$ indicates a predetermined reference time; and $\lambda$ refers to a time decay factor, and $0 < \lambda < 1$. Of course, the present disclosure is not limited to this. The time weight $w(t_k)$ may also be computed by other equations as long as it has a negative correlation with the interval from the behavior occurrence time to the predetermined reference time, i.e., $w(t_k)$ is a monotone decreasing function of $(t_0 - t_k)$.

The weight (also called a "type weight") $w(l_k)$ of the behavior type may be set on the basis of the importance degree of the k-th behavior; that is, the higher the importance degree is, the larger the type weight is. For instance, compared to a browsing behavior, a user needs to pay much money as to a purchasing behavior. In other words, in terms of the preference score of a user regarding a commodity, the purchasing behavior is higher than the browsing behavior. As such, when the behavior type is "Browsing", the value $w(l_k)$ may be set to one, and when behavior type is "Purchasing", the value of $w(l_k)$ may be set to ten.

The weight (also called a "place weight") $w(b_k)$ of the behavior occurrence place may be set on the grounds of different occurrence places of the k-th behavior, for example, different web sites.

Here, those skilled in the art should understand that by adjusting the respective weights in the formula (1), it is also possible to create various forms of the preference score calculation formula. For example, if a weight is set to a fixed value (e.g., one), the significance of the weight in the preference score calculation process may be ignored.

(Approach 2)

A combination of more or different weight parameters may also be adopted to calculate the preference score of each of the plural users concerning the same commodity. For instance, in a case where the behavior record further contains a behavior duration of each behavior, by analyzing the sub behavior record of the same user concerning the same commodity, it is possible to get the behavior occurrence time, the behavior type, the behavior occurrence place, and the behavior duration of each behavior of the same user regarding the same commodity. And then, on the basis of the behavior occurrence time, the behavior type, the behavior occurrence place, and the behavior duration of each behavior of the same user regarding the same commodity, the score pertaining to each behavior of the same user about the same commodity may be calculated and summed up, so as to obtain the preference score of the same user with respect to the same commodity.

In this approach, a formula which may be adopted to calculate the preference score of each of the plural users with regards to the same commodity is as follows.

$$r_{ij} \sum_{k \in K_{ij}} w(t_k) \cdot w(l_k) \cdot w(b_k) \cdot w(d_k) \quad (3)$$

Here, regarding the meaning of each of the parameters in the formula (3) which are the same as those in the formula (1), it is possible to refer to the description above; $d_k$ denotes the behavior duration of the k-th behavior; and $w(d_k)$ is indicative of the weight (also called a "duration weight") corresponding to the behavior duration of the k-th behavior. Generally speaking, the longer the duration of a behavior of a user regarding a commodity is, the higher the preference score of the user about the commodity is. As such, the duration weight $w(d_k)$ may use a monotone increasing function of $d_k$; for instance, the monotone increasing function may be a Sigmoid function. In particular, the duration weight $w(d_k)$ may be expressed as follows.

$$w(d_k) = \frac{1}{1 + e^{-d_k}} \quad (4)$$

Since the value of the behavior duration of each of accessing behaviors is positive, the value range of the duration weight $w(d_k)$ is usually (0.5, 1). In actual applications, in order to ensure the accuracy of the calculated preference scores, it is also possible to filter out some behaviors whose durations are too short in advance. The reason is that these kinds of behaviors may be due to the misoperation of a user.

Here, those skilled in the art should understand that by adjusting the respective weights in the formula (3), it is also possible to create various forms of the preference score calculation formula. For instance, if a weight is set to a fixed value (e.g., one), the significance of the weight in the preference score calculation process may be ignored.

As a result, in this step, after acquiring the preference scores of the plural users regarding the plural commodities, it is possible to make up of the score matrix on the grounds of the preference scores. For example, in STEP S11 of FIG. 1, the number of the plural users is M, and the number of the plural commodities is N. Hence, in this case, the score matrix may be an M*N matrix as follows.

$$R = \{r_{ij}\}_{M \times N} \quad (5)$$

Here, R refers to the score matrix.

According to the formula (5), it can be understood that each row in the score matrix R represents the preference scores of the same user regarding to the different commodities, and each column therein indicates the preference scores of the different users concerning to the same commodity.

Here it should be noted that there is no restriction on the execution order of STEPS S12 and S13. That is, it is possible to first conduct STEP S12, and then, conduct STEP S13, and vice versa; of course, the two may also be carried out in parallel.

Referring to STEP S14 of FIG. 1 again; in STEP S14, for each of the plural users, the user feature vector of this user in the same predetermined commodity feature space (i.e., each of the predetermined commodity feature spaces) is obtained on the grounds of the regularized least squares based solution of a difference function of the score matrix and a prediction matrix. The prediction matrix is the inner product of a user feature matrix and the commodity feature matrix, and the user feature matrix is made up of the user feature vectors of the plural users.

In this embodiment, the value of each element in the user feature vector of each of the plural users is used to indicate the preference degree of this user regarding the corresponding commodity feature in the same predetermined commodity feature space. In this way, it is possible to reflect the satisfaction degrees of each of the plural users concerning the respective commodity features in the same predetermined commodity feature space. Here it should be noted that the user feature vector of each of the plural users is regarded as a preference related image pertaining to this user; by utilizing the preference related image, it is possible to understand the real needs of the same user, and recommend a suitable commodity or customize a new product for the same user.

In order to obtain the user feature vector of each of the plural users, it is possible to set an objective function which is a function of the difference between the score matrix and the prediction matrix, and then, solve the objective function by regularized least squares, so as to acquire a user feature matrix when the minimum value of the objective function is found, in which the column vectors are the user feature vectors of the plural users, respectively. Thus the user feature vector of each of the plural users may be acquired.

In this embodiment, the score matrix obtained in STEP S13 of FIG. 1 may contain one or more elements whose values are unknown. For instance, as for a user, if the sub behavior record of the user about a commodity in the behavior record does not exist, then the preference score of the user regarding the commodity does not exist either, thereby resulting that the value of the corresponding element in the score matrix is unknown (missing).

In what follows, how to set the objective function and how to obtain the user feature vectors will be introduced in regards to two cases, namely, when the values of all the elements of the score matrix are known and when the score matrix includes one or more elements whose values are unknown.

(Case 1)

When the values of all the elements of the score matrix are known, it is possible to solve the regularized least squares problem according to the following formula.

$$\min_{U} Tr\{(R - U^T V)(R - U^T V)^T + \alpha U^T U\} \quad (6)$$

Here, if it is assumed that the number of the plural users is M, the number of the plural commodities is N, and each of the predetermined commodity feature spaces includes S commodity features, then R is a M*N score matrix; V is a S*N commodity feature matrix consisting of the commodity feature vectors of N commodities; α is an adjustment factor serving as a regularized weight which is a constant greater than or equal to zero; U is a S*M user feature matrix including the user feature vectors of M users (i.e., the preference related images of M users) which is to be solved; and Tr{Z} is a difference function serving as the objective function which indicates the trace of the matrix Z, i.e., the diagonal sum of the matrix Z.

The optimum solution of the regularized lease squares problem may be acquired by taking the derivative with respect to the independent variable and letting the derivative be zero. Namely, the minimum value of the objective function may be achieved when the matrix derivative of the objective function is zero. The detailed process may be expressed by the follow formula.

$$\frac{d\{Tr\{(R - U^T V)(R - U^T V)^T + \alpha U^T U\}\}}{d(U)} = 0 \quad (7)$$

By using the related matrix derivative formula, it is possible to acquire the following formula.

$$-VR^T - VR^T + 2*VV^T U + 2\alpha * U = 0 \quad (8)$$

The optimum solution of the formula (8) is as follows.

$$U = (\alpha I + VV^T)^{-1} VR^T \quad (9)$$

Here, I is indicative of an identity matrix, and αI is called an "adjusted identity matrix".

In the above-described calculation process, α is a constant whose value is greater than or equal to zero. When the value of α is equal to zero, it is also possible to get the optimum solution by directly calculating the pseudo inverse matrix of the matrix V. At this time, the matrix U may be expressed by the following formula.

$$U = (V)^+ R^T \quad (10)$$

Here $(V)^+$ refers to the pseudo inverse of the matrix V, and is also known as a generalized inverse.

Aside from this, any other proper approach may be adopted to gain the matrix U in this embodiment. For example, it is possible to first stretch the matrix U to be solved so as to get vectors, then calculate the Kronecker product of them, and then, obtain the solution by employing ordinary least squares.

Each column of the optimum solution U is the user feature vector pertaining to one of the plural users which indicates the preference degrees of this user in regards to the respective commodity features in the same predetermined commodity feature space. As such, the user feature vector belonging to each of the plural users obtained in this embodiment reflects the preference degree of this user in regards to the corresponding commodity and the preference degrees of this user with respect to the respective commodity features of the corresponding commodity. Here it should be noted that the above-described process of obtaining the user feature vectors corresponding to the plural users is also regarded as a user preference related image generation process.

(Case 2)

When the score matrix includes one or more elements whose values are unknown, it is also possible to acquire the user feature vectors of the plural users in a similar way.

However, only the preference scores whose values are known are taken into account, i.e., the preference scores whose values are unknown are ignored. In particular, the formula (6) may be rewritten as follows.

$$\min_{u_i} \sum_{i=1}^{M} \left( \sum_{j \in \Phi_i} (r_{ij} - u_i^T v_j)^2 + \lambda_u \|u_i\|^2 \right) \quad (11)$$

Here $\Phi_i$ refers to a set of commodities regarding which the preference scores of the i-th user in the score matrix are known, i.e., $\Phi_i = \{j | r_{ij}$ being the preference score whose value is known$\}$; $\lambda_u$ denotes a predetermined regular term related weight; $v_j$ means the commodity feature vector of the j-th commodity; $r_{ij}$ indicates the preference score of the i-th user about the j-th commodity; and $u_i$ represents the user feature vector of the i-th user in the same predetermined commodity feature space. At this time, $$\sum_{i=1}^{M} \left( \sum_{j \in \Phi_i} (r_{ij} - u_i^T v_j)^2 + \lambda_u \|u_i\|^2 \right)$$

is a difference function serving as the objective function.

The optimum solution of the formula (11) is as follows which may be obtained in a way similar to the way of acquiring the optimum solution of the formula (6) by utilizing the formulas (7) to (9).

$$\hat{u}_i = \left( \sum_{j \in \Phi_i} v_j v_j^T + \lambda_u I \right)^{-1} \sum_{j \in \Phi_i} v_j r_{ij} \quad (12)$$

Here, $\hat{u}_i$ is the optimum solution of the formula (11), i.e., the user feature vector of the i-th user in the same predetermined commodity feature space, and I refers to an identity matrix.

By carrying out the above-described steps, in this embodiment, it is possible to determine, based on the behavior record of the plural users regarding the plural commodities, the commodity feature matrix corresponding to the plural commodities, and then, determine, according to the commodity feature matrix and the score matrix of the preference scores of the plural users, the user feature matrix of the plural users in the predetermined commodity feature spaces. In the above-described user behavior analysis process, the commodity features of the plural commodities are considered, and at the same time, the preference degrees of the plural users regarding the commodity features of the plural commodities are also taken into account. As such, by utilizing the user feature vectors obtained in this embodiment, it is possible to better reflect the preference degrees of the plural users with respect to the commodity features of the different commodities, so that when conducting commodity recommendation, it is possible to better satisfy the needs of the plural users, and let the recommended commodities be more accurate.

Consequently, the user behavior analysis method according to this embodiment may further include a step after STEP S14 in FIG. 1, of taking advantage of the user feature vectors of the plural users in the predetermined commodity feature spaces to recommend commodities for the plural users, so that the recommended commodities may be more pertinent, and better meet the demands of the plural users.

In actual applications, the behavior record of the plural users concerning the plural commodities is collected with time. Hence one or more elements of the score matrix may be updated with time. For example, as for some elements thereof, their values may be unknown at a time point, but become known after a time period; and vice versa of course.

Considering the above, the user behavior analysis method according to this embodiment may further include a step of performing, by employing the following regularized least squares based incremental calculation formula (13), an incremental update process on the user feature vectors so as to obtain an updated user feature vectors when the score matrix is updated.

$$\hat{u}_i^{(x+1)} = \hat{u}_i^{(x)} + P_{x+1} v_x (v_x^T P_x v_x + 1)^{-1} (r_{ix} - v_x^T \hat{u}_i^{(x)}) \quad (13)$$

$$P_x = \left( \sum_{j \in \Phi_i} v_j v_j^T + \lambda_u I \right)^{-1} \quad (14)$$

$$P_{x+1} \left( \sum_{j \in \Phi_i} v_j v_j^T + v_x v_x^T + \lambda_u I \right)^{-1} \quad (15)$$

Here, $\hat{u}_i^{(x)}$ means the user feature vector obtained at the time of the x-th incremental update; $\hat{u}_i^{(x+1)}$ represents the user feature vector acquired at the time of the (x+1)-th incremental update; $v_x$ indicates the updated commodity feature vector after the x-th incremental update; $v_j$ denotes the commodity feature vector of the j-th commodity before the x-th incremental update; $r_{ix}$ refers to the updated preference score of the i-th user in the updated score matrix after the x-th incremental update; $\lambda_u$ stands for a predetermined regular item related weight; I represents an identity matrix; and $\Phi_i$ is indicative of a set of commodities regarding which the preference score of the i-th user in the updated score matrix are known.

Figure 3:
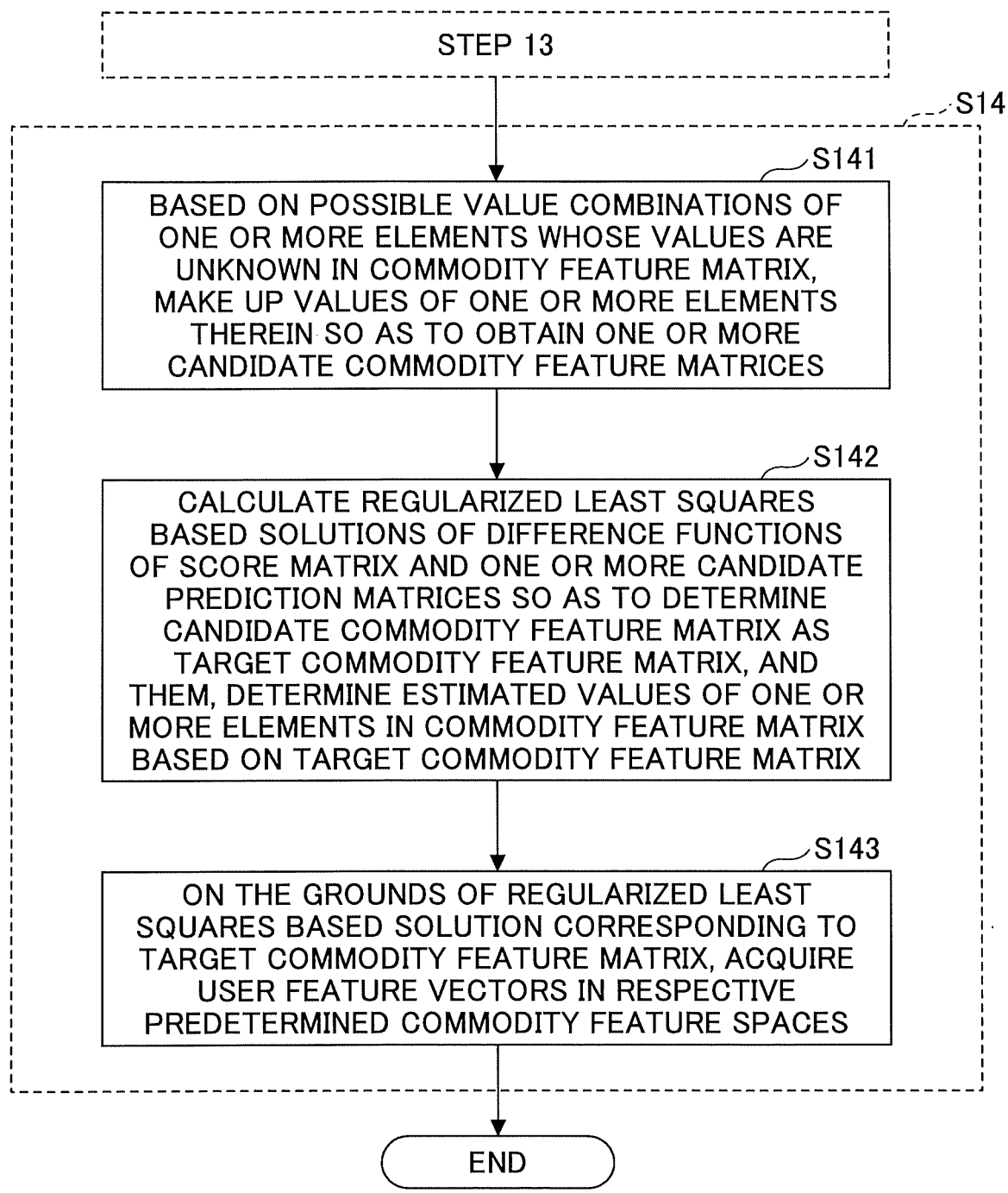
FIG. 3 illustrates a detailed process of STEP S14 in the user behavior analysis method according to the first embodiment of the present disclosure.

In addition, with regards of the commodity feature vectors (i.e., the commodity feature matrix) of the plural commodities determined in STEP S12 of FIG. 1, the values of one or more elements in the commodity feature vector of at least one commodity may be uncertain (unknown). For this reason, STEP S14 of FIG. 1 may contain sub steps S141 to S143, as shown in FIG. 3. Here it should be noted that FIG. 3 illustrates a detailed process of STEP S14 in FIG. 1.

In the sub step S141, on the grounds of all the possible value combinations of the one or more elements, the values of the one or more elements in the commodity feature matrix are made up so as to beget one or more candidate commodity feature matrices.

In the sub step S142, for each candidate commodity feature matrix, a difference function of the score matrix and a candidate prediction matrix (i.e., the inner product of this candidate commodity feature matrix and the user feature matrix) is solved by using regularized least squares, thereby finding a candidate commodity feature matrix, by which the solution of the difference function is minimum, serving as a target commodity feature matrix. And then, in light of the values of all the elements in the target commodity feature matrix, the estimated values of the one or more elements in the commodity feature matrix are determined.

In the sub step S143, on the basis of the regularized least squares based solution corresponding to the target commodity feature matrix, the user feature vectors of the plural users in the predetermined commodity feature spaces are obtained.

Particularly, in the sub step S142, for each candidate commodity feature matrix, it is possible to use the formula (9) or (12) to perform calculation on this candidate commodity feature matrix, thereby selecting a candidate commodity feature, by which the solution of the difference function is minimum, serving as the target commodity feature matrix, so as to acquire the user feature vectors of the plural users in the predetermined commodity feature spaces, and let the values of the one or more elements in the target commodity feature matrix be the estimated values of the one or more elements in the commodity feature matrix.

Figure 4:
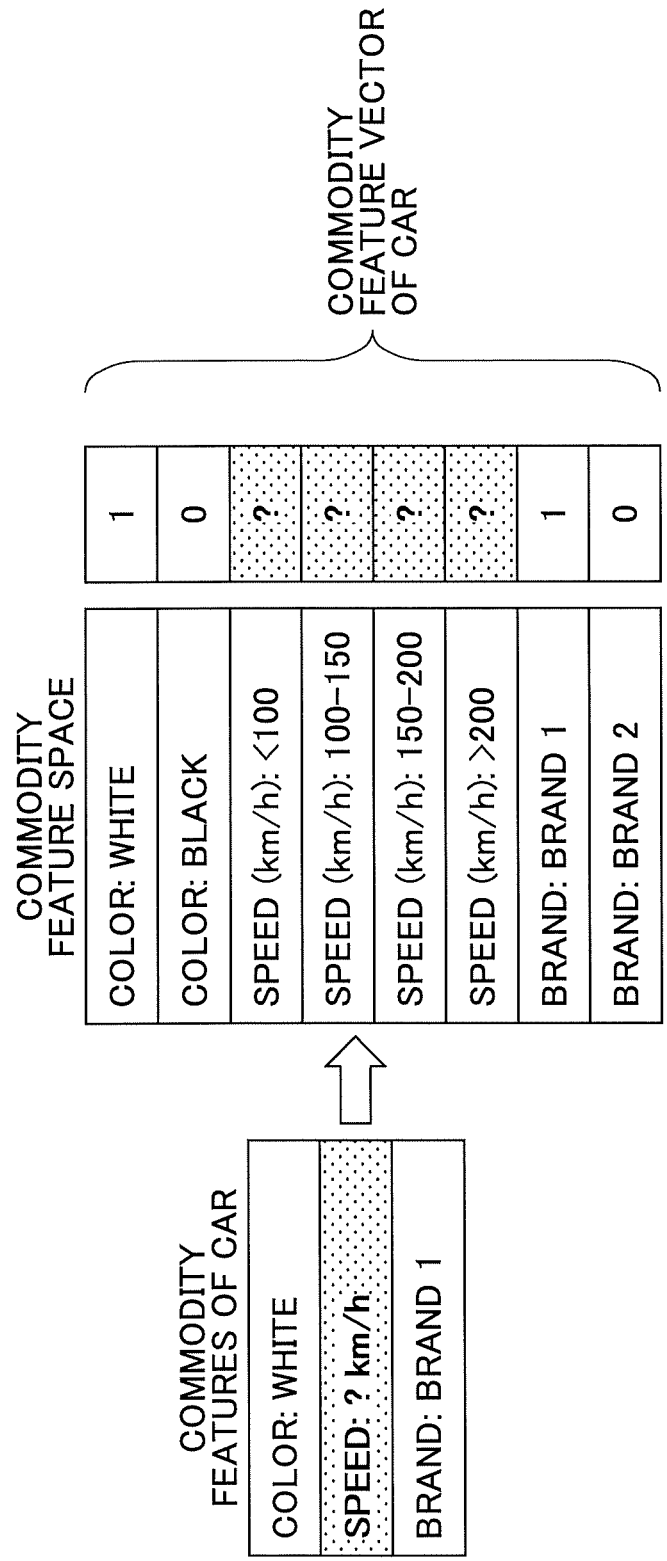
FIG. 4 illustrates an exemplary commodity feature vector with elements whose values are missing in the first embodiment of the present disclosure.

For example, if it is supposed that the maximum speed of the car in FIG. 2 is unknown, then the obtained commodity feature vector (a binary vector) of the car may have four elements without values, as presented in FIG. 4. Here it should be noted that FIG. 4 illustrates an exemplary commodity feature vector with elements whose values are missing. Since the value of each element in the obtained commodity feature vector of the car is just zero or one, and because the value of an element therein relating to the maximum speed of the car can only be one, it is possible to obtain all the possible commodity feature vectors, i.e., four possible commodity feature vectors, as shown in FIG. 5. Here it should be noted that FIG. 5 illustrates all the possible commodity feature vectors obtained when making up the missing values of the elements of the exemplary commodity feature vector in FIG. 4. After that, for each of the four possible commodity feature vectors shown in FIG. 5, it is possible to employ the formula (9) or (12) to carry out calculation with respect to this possible commodity feature vector, thereby determining a possible commodity feature vector by which the value of the related objective function is minimum, and then, it is possible to obtain the missing values of the four elements in the obtained commodity feature vector of the car shown in FIG. 4 on the basis of the determined possible commodity feature vector.

Therefore, it may be understood according to the above that this embodiment provides a method of calculating the preference degrees of the plural users regarding the respective commodity features of each of the plural commodities on the basis of the preference scores of the plural users concerning the plural commodities and the distribution of the commodity features of the plural commodities. The computational complexity of the method is low, and the computed result may be used to intuitively determine the points of interest of the plural users, so that it is possible to recommend commodities suitable for the plural users. Furthermore, the preference scores of the plural users with respect to the plural commodities are obtained based on the behavior record of the plural users in regards to the plural commodities so that the preference scores obtained in this way are more objective and reliable. Moreover, by employing a regularized least squares based incremental update approach to perform incremental update on the user feature matrix, it is possible to reduce the calculation amount when maintaining the user feature matrix. In addition, when the values of elements in at least one commodity feature vector are missing, an approach of estimating the values of the elements is proposed; as a result, on the grounds of the at least one commodity feature vector in which the missing values of the element are made up based on the estimation and the other commodity feature vectors, it is also possible to obtain the user feature vectors.

Second Embodiment

In this embodiment, a user behavior analysis device 600 is given which corresponds to the user behavior analysis method according to the first embodiment.

Figure 6:
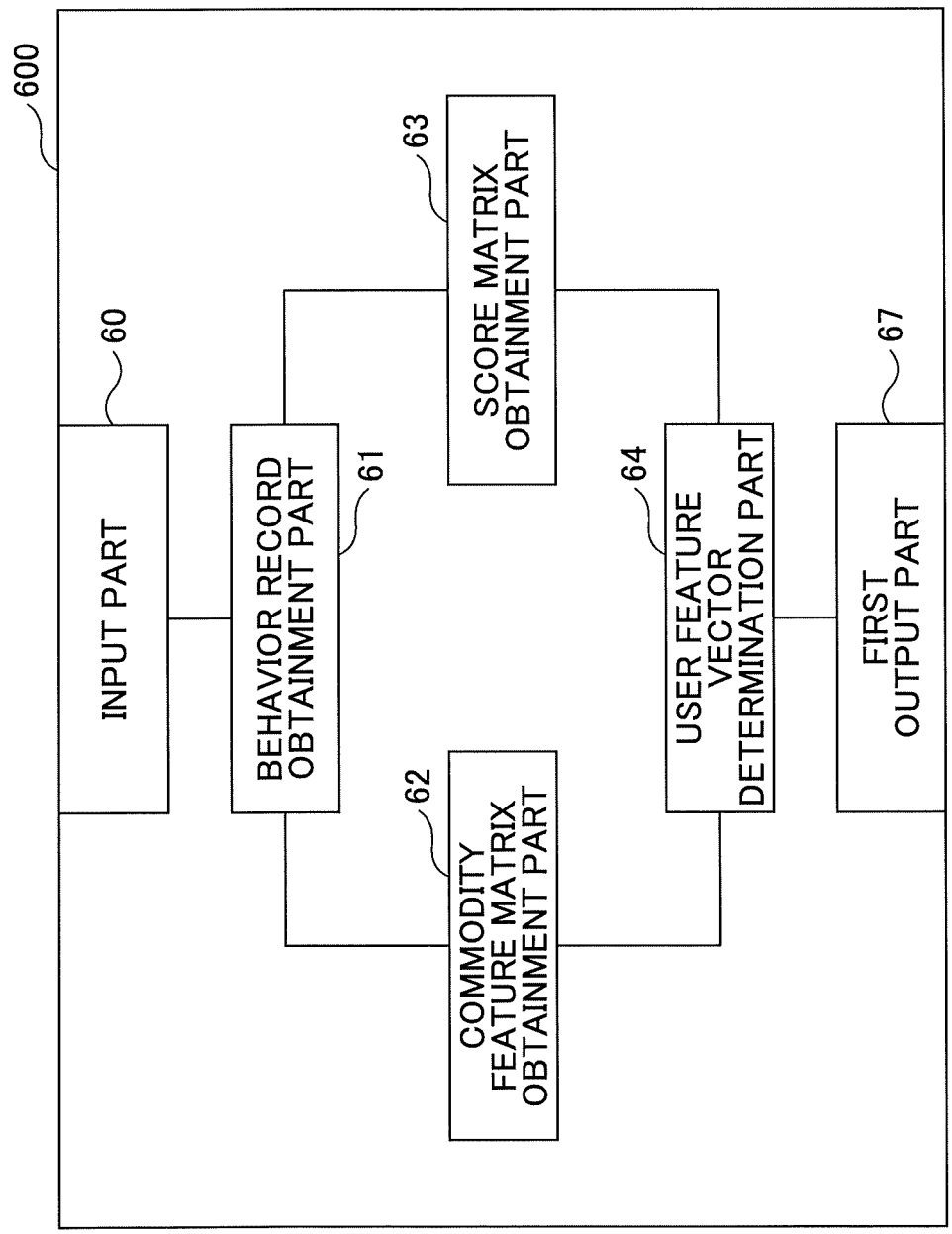
FIG. 6 illustrates an exemplary structure of a user behavior analysis device according to a second embodiment of the present disclosure.

FIG. 6 illustrates an exemplary structure of the user behavior analysis device 600.

As presented in FIG. 6, the user behavior analysis device 600 includes a behavior record obtainment part 61, a commodity feature matrix obtainment part 62, a score matrix obtainment part 63, and a user feature vector determination part 64.

The commodity feature matrix obtainment part 62 is configured to acquire a behavior record of plural users (different user) with respect to plural commodities (different commodities), i.e., carry out STEP S11 in FIG. 1.

The score matrix obtainment part 63 is configured to obtain, by determining a commodity feature vector in a predetermined commodity feature space of each of the plural commodities, a commodity feature matrix consisting of the commodity feature vectors of the plural commodities, i.e., conduct STEP S12 in FIG. 1.

The user feature vector determination part 64 is configured to, for each of the plural users, get the user feature vector of this user in the same predetermined commodity feature spaces (i.e., each of the predetermined commodity feature spaces) on the grounds of the regularized least squares based solution of a difference function of the score matrix and a prediction matrix. The prediction matrix is the inner product of a user feature matrix and the commodity feature matrix, and the user feature matrix is made up of the user feature vectors of the plural users. That is, the user feature vector determination part 64 is configured to perform STEP S14 in FIG. 1.

Furthermore, the user behavior analysis device 600 shown in FIG. 6 further includes an input part 60 and a first output part 67.

The input part 60 is configured to provide the behavior record of the plural users regarding the plural commodities to the behavior record obtainment part 61.

The first output part 67 is configured to output the user feature vectors of the plural users in the commodity feature spaces which are obtained by the user feature vector determination part 64.

As an example, the behavior record may contain a behavior occurrence time, a behavior type, and a behavior occurrence place. In this example, the score matrix obtainment part 63 may include an analysis unit and a first calculation unit.

The analysis unit is configured to analyze the sub behavior record of the same user (i.e., each of the plural users) concerning the same commodity (i.e., each of the plural commodities) so as to acquire the behavior occurrence time, the behavior type, and the behavior occurrence place of each behavior of the same user with respect to the same commodity.

The first calculation unit is configured to, for each behavior, calculate and sum up the scores of this behavior on the basis of its behavior occurrence time, behavior type, and behavior occurrence place, so as to acquire the preference score of the same user in regards to the same commodity. The behavior occurrence time, the behavior type, and the behavior occurrence place have corresponding weights when computing the preference score, and the weight corresponding to the behavior occurrence time has a negative correlation with the interval between the behavior occurrence time and a predetermined reference time.

Here, the first calculation unit is configured to calculate the preference score of the same user about each of the plural commodities on the basis of the behavior occurrence time, the behavior type, and the behavior occurrence place of each behavior according to the following formula.

$$r_{ij} = \sum_{k \in K_{ij}} w(t_k) \cdot w(l_k) \cdot w(b_k) \qquad (16)$$

Here, $r_{ij}$ refers to the preference score of the i-th user concerning the j-th commodity; $K_{ij}$ indicates the behavior set of the i-th user regarding the j-th commodity; k denotes the k-th behavior of the i-th user about the j-th commodity; $t_k$, $l_k$, and $b_k$ are indicative of the behavior occurrence time, the behavior type, and the behavior occurrence place of the k-th behavior, respectively; and $w(t_k)$, $w(l_k)$, and $w(b_k)$ means the weights corresponding the behavior occurrence time, the behavior type, and the behavior occurrence place of the k-th behavior.

In this embodiment, when the values of all the elements in the score matrix are known, the user feature vector determination part 64 is configured to determine the user feature vectors as the column vectors of the user feature matrix which may be expressed as follows.

$$U = (\alpha I + VV^T)^{-1} VR^T \qquad (17)$$

Here, U stands for the user feature matrix; V refers to the commodity feature matrix; I is indicative of an identity matrix; α presents a predetermined adjustment factor which is a constant greater than or equal to zero; and R denotes the score matrix.

When there are one or more elements whose values are unknown in the score matrix, the user feature vector determination part 64 is configured to determine the user feature vector of the i-th user in the related predetermined commodity feature space, which may be expressed as follows.

$$\hat{u}_i = \left( \sum_{j \in \Phi_i} v_j v_j^T + \lambda_u I \right)^{-1} \sum_{j \in \Phi_i} v_j r_{ij} \qquad (18)$$

Here, $\hat{u}_i$ refers to the user feature vector of the i-th user; $v_j$ means the commodity feature vector of the j-th commodity; $\lambda_u$ denotes a predetermined regular term related weight; I is an identity matrix; $r_{ij}$ indicates the preference score of the i-th user about the j-th commodity; and $\Phi_i$ refers to a set of commodities regarding which the preference scores of the i-th user in the score matrix are known.

In this embodiment, in a case where the commodity feature matrix contains at least one commodity feature vector in which the values of one or more elements are unknown, the user feature vector determination part 64 may include a first determination unit, a second calculation unit, and a second determination unit.

The first determination unit is configured to, on the grounds of all the possible value combinations of the one or more elements, make up the values of the one or more elements in the commodity feature matrix so as to beget one or more candidate commodity feature matrices, i.e., carry out the sub step S141 in FIG. 3.

The second calculation unit is configured to, for each candidate commodity feature matrix, solve a difference function of the score matrix and a candidate prediction matrix (i.e., the inner product of this candidate commodity feature matrix and the user feature matrix) by using regularized least squares, thereby finding a candidate commodity feature matrix, by which the solution of the difference function is minimum, serving as a target commodity feature matrix, and then, determine the estimated values of the one or more elements in the commodity feature matrix on the basis of the values of the corresponding elements in the target commodity feature matrix. That is, the calculation unit is configured to conduct the sub step S142 in FIG. 3.

The second determination unit is configured to, on the basis of a regularized least squares based solution corresponding to the target commodity feature matrix, determine the user feature vectors of the plural users in the respective predetermined commodity feature spaces, i.e., perform the sub step S143 in FIG. 3.

Third Embodiment

In this embodiment, a user behavior analysis device 700 is given which is based on the user behavior analysis device 600 according to the second embodiment.

Figure 7:
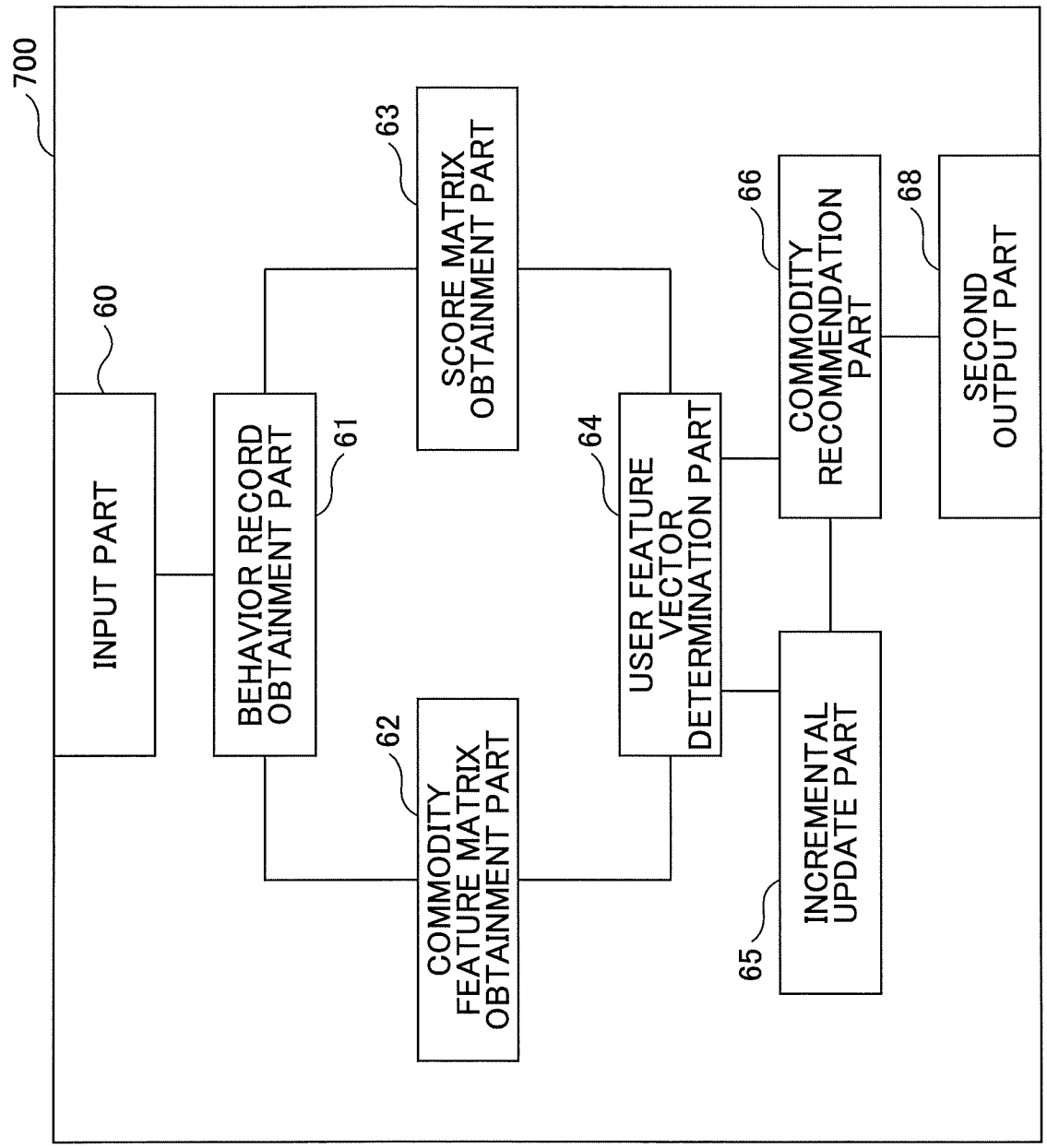
FIG. 7 illustrates an exemplary structure of a user behavior analysis device according to a third embodiment of the present disclosure.

FIG. 7 illustrates an exemplary structure of the user behavior analysis device 700.

In particular, as shown in FIG. 7, compared to the user behavior analysis device 600, the user behavior analysis device 700 does not include the first output part 67 in FIG. 6, but it further includes an incremental update part 65, a commodity recommendation part 66, and a second output part 68. In what follows, only the incremental update part 65, the commodity recommendation part 66, and the second output part 68 will be concretely described for the sake of convenience.

The incremental update part 65 is configured to, when the score matrix is updated, perform an incremental update process on the user feature vectors by employing a regularized least squares based incremental calculation formula so as to get an updated user feature vectors.

The commodity recommendation part 66 is configured to recommend commodities for the plural users on the grounds of the user feature vectors of the plural users in the respective predetermined commodity feature spaces.

The second output part 68 is configured to output the commodities recommended by the commodity recommendation part 66.

As a result, it may be understood according to the above that in the second and third embodiments, it is possible to determine, based on the behavior record of the plural users regarding the plural commodities, the commodity feature matrix corresponding to the plural commodities, and then, determine, according to the commodity feature matrix and the score matrix of the preference scores of the plural users, the user feature matrix of the plural users in the predetermined commodity feature spaces. In the above-described user behavior analysis process, the commodity features of the plural commodities are considered, and at the same time, the preference degrees of the plural users regarding the commodity features are also taken into account. As such, by utilizing the user behavior analysis devices 600 and 700 according to these two embodiments, when conducting commodity recommendation, it is possible to better satisfy the needs of the plural users and let the recommended commodities be more accurate.

Fourth Embodiment

In this embodiment, a user behavior analysis device 800 is given.

Figure 8:
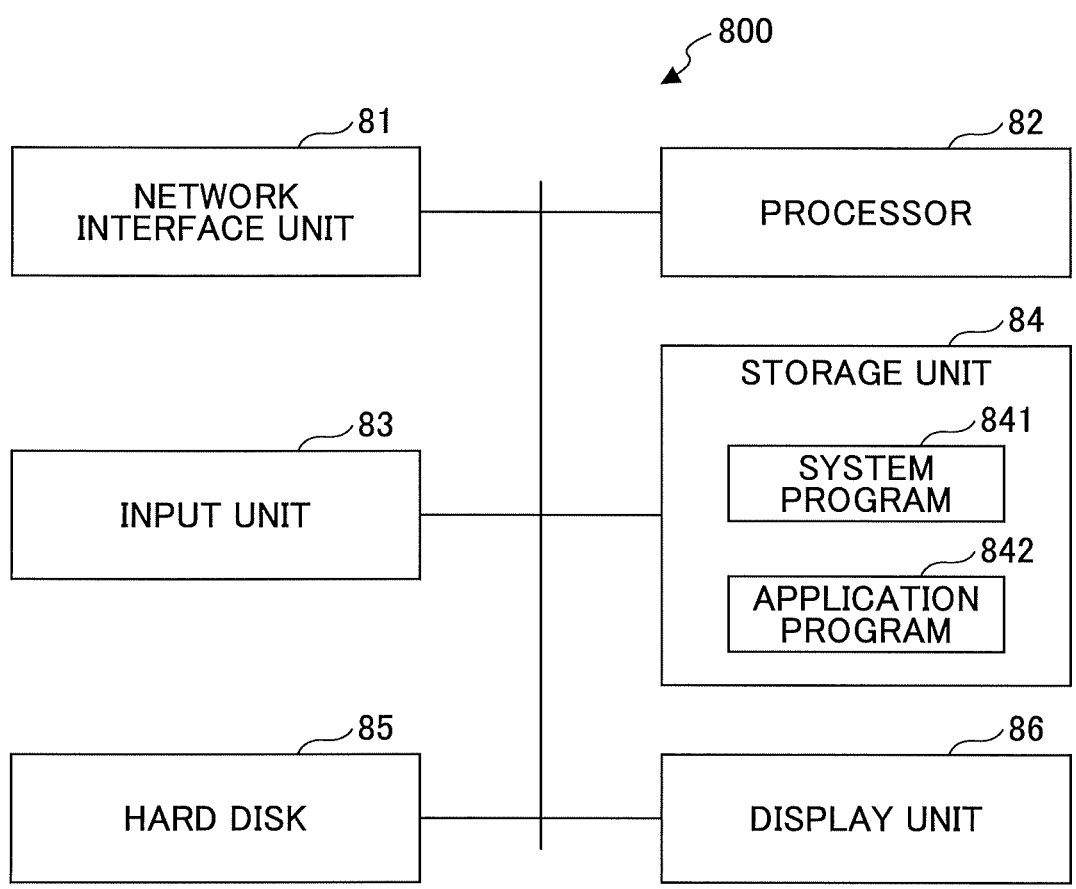
FIG. 8 illustrates an exemplary structure of a user behavior analysis device according to a fourth embodiment of the present disclosure.

FIG. 8 illustrates an exemplary structure of the user behavior analysis device 800.

As presented in FIG. 8, the user behavior analysis device 800 is inclusive of a network interface unit 81, a processor 82, an input unit 83, a storage unit 84, a hard disk 85, and a display unit 86 which may be connected via a bus.

The network interface unit 81 may be connected to a network such as the Internet, a local area network, and the like, and is configured to obtain the related data from the network, for example, the behavior record of plural users regarding plural commodities, and then, cause the behavior record to be stored in the hard disk 85. The network interface unit 81 may adopt a conventional one, for instance.

The input unit 83 may receive various instructions input by an operator, and then, send the various instructions to the processor 82. The input unit 83 may include a keyboard, a mouse, a trackball, a touch panel, etc.

The storage unit 84 may store programs and data necessary to the running of the relevant operating system, the intermediate results obtained during the calculation process of the processor 82, etc. The storage unit 84 may include a volatile or nonvolatile one, for example.

The display unit 86 may display the results obtained after the processor 82 executes the programs according to the various instructions. The display unit 86 may include a liquid crystal display, a projector, etc.

As an example, the storage unit 84 includes a system program 841 and an application program 842, as shown in FIG. 8. The system program 841 may contain various system programs like operating system related programs, and the application program 842 may include various application programs.

In this embodiment, a program consisting of computer-executable instructions for achieving the user behavior analysis method according to the first embodiment may be included in the application program 842. However, the present disclosure is not limited to this. When the computer-executable instructions are executed by the processor 82, they may cause the processor 82 to carry out the user behavior analysis method according to the first embodiment.

Here it should be noted that the embodiments of the present disclosure may be implemented in any convenient form, for example, using dedicated hardware or a mixture of dedicated hardware and software. The embodiments of the present disclosure may be implemented as computer software implemented by one or more networked processing apparatuses. The network may comprise any conventional terrestrial or wireless communications network, such as the Internet. The processing apparatuses may comprise any suitably programmed apparatuses such as a general-purpose computer, a personal digital assistant, a mobile telephone (such as a WAP or 3G-compliant phone) and so on. Since the embodiments of the present disclosure can be implemented as software, each and every aspect of the present disclosure thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present disclosure is described with reference to the specific embodiments chosen for purpose of illustration, it should be apparent that the present disclosure is not limited to these embodiments, but numerous modifications could be made thereto by those skilled in the art without departing from the basic concept and technical scope of the present disclosure.

The present application is based on and claims the benefit of priority of Chinese Patent Application No. 201610657788.2 filed on Aug. 11, 2016, the entire contents of which are hereby incorporated by reference.

What is claimed is:

1. A commodity recommendation method comprising:
    obtaining a behavior record of plural users regarding plural commodities;
    determining a commodity feature vector in a predetermined commodity feature space for each of the plural commodities;
    acquiring a commodity feature matrix consisting of the determined commodity feature vectors of the plural commodities;
    calculating a preference score for each of the plural users regarding each of the plural commodities based on a sub behavior record of each user regarding each of the plural commodities;
    obtaining a score matrix composed of the preference scores of the plural users regarding the plural commodities;
    determining a user feature vector for each of the plural users in respective predetermined commodity feature spaces for each of the plural commodities based on a regularized least squares based solution of a difference function of the score matrix and a prediction matrix, the prediction matrix being an inner product of a user feature matrix and the commodity feature matrix, the user feature matrix being made up of the user feature vectors of the plural users; and
    displaying the results of the determined user feature vector, based on the determined user feature vectors of the plural users in the respective predetermined commodity feature spaces, on a display unit of a processing apparatus to a user of the processing apparatus as one or more recommended commodities from among the plural commodities, wherein
    the behavior record includes at least one of a behavior occurrence time, a behavior occurrence type, and a behavior occurrence place for each behavior included in the behavior record;

the behavior occurrence time, the behavior type, and the behavior occurrence place of each behavior is respectively assigned a weight, the weight including at least
a time weight, which is negatively correlated with an interval between a behavior occurrence time and a predetermined reference time, and
a priority weight, which is a value that is assigned in accordance with a priority given to the at least one of the behavior occurrence time, the behavior type, and the behavior occurrence place, the value being larger for a higher priority and smaller for a lower priority.

2. The commodity recommendation method according to claim 1, wherein calculation of the preference score for each of the plural users regarding each of the plural commodities further comprises:
analyzing the sub behavior record for each of the plural users regarding each of the plural commodities;
obtaining the behavior occurrence time, the behavior type, and the behavior occurrence place of each behavior of the corresponding user regarding each of the plural commodities, based on the analyzed sub behavior record for each of the plural users;
calculating a score of the corresponding behavior relating to each of the plural commodities for each behavior based on the behavior occurrence time, the behavior type, and the behavior occurrence place of the corresponding behavior; and
summing up the scores of the behaviors for each of the plural commodities; and
obtaining the preference score of the corresponding user regarding the corresponding commodity based on the summed up scores of the behaviors for each of the plural commodities.

3. The commodity recommendation method according to claim 1, wherein,
the user feature vectors are determined as column vectors of the user feature matrix, wherein the user feature matrix is expressed using the following equation, for the score matrix in which values for all elements are obtained:

$$U = (\alpha I + VV^T)^{-1} VR^T$$

where U stands for the user feature matrix; V refers to the commodity feature matrix; I is indicative of an identity matrix; $\alpha$ presents a predetermined adjustment factor which is a constant greater than or equal to zero; and R denotes the score matrix.

4. The commodity recommendation method according to claim 1, wherein
a user feature vector of an i-th user in its related predetermined commodity feature space is expressed using the following equation, for the score matrix in which values for one or more elements are unknown:

$$\hat{u}_i = \left(\sum_{j \in \Phi_i} v_j v_j^T + \lambda_u I\right)^{-1} \sum_{j \in \Phi_i} v_j r_{ij},$$

where $\hat{u}_i$ refers to the user feature vector of the i-th user; $v_j$ means the commodity feature vector of the j-th commodity; $\lambda_u$ denotes a predetermined regular term related weight; I indicates an identity matrix; $r_{ij}$ presents the preference score of the i-th user regarding the j-th commodity; and $\Phi_i$ stands for a set of commodities regarding which the preference scores of the i-th user in the score matrix are known.

5. The commodity recommendation method according to claim 1, wherein
the user feature vectors of the plural users in the respective predetermined commodity feature spaces are determined for the commodity feature matrix that includes at least one commodity feature vector in which values of one or more elements are unknown by
randomly generating values of the one or more elements in the commodity feature matrix based on all possible value combinations of the one or more elements to thereby acquire one or more candidate commodity feature matrices;
solving a difference function of the score matrix and a candidate prediction matrix for each candidate commodity feature matrix using regularized least squares, the candidate prediction matrix being an inner product of the corresponding candidate commodity feature matrix and the user feature matrix, to find a candidate commodity feature matrix, by which the solution of the difference function is minimum, the found candidate commodity feature matrix serving as a target commodity feature matrix;
determining estimated values of the one or more elements of the at least one commodity feature vector in the commodity feature matrix based on values of all elements in the target commodity feature matrix; and
obtaining the user feature vectors of the plural users in the respective predetermined commodity feature spaces based on the regularized least squares based solution corresponding to the target commodity feature matrix.

6. The commodity recommendation method according to claim 1, wherein the updating of the score matrix further comprises:
incrementally updating the user feature vectors based on a regularized least squares based incremental calculation formula to acquire updated user feature vectors.

7. A commodity recommendation device comprising a network interface unit, a processor, an input unit, a storage unit, and a display unit which are connected via a bus, wherein,
the network interface unit is configured to connect to a network;
the input unit is configured to receive instructions, and send the instructions to the processor;
the storage unit is configured to store a system program and an application program as well as intermediate data during a calculation process of the processor;
the display unit is configured to display results obtained by the processor; and
the processor is configured to conduct, by executing the application program, the commodity recommendation method according to claim 1.

8. A non-transitory computer-readable medium having computer-executable instructions for execution by a processing system, wherein, the computer-executable instructions, when executed, cause the processing system to carry out the commodity recommendation method according to claim 1.

9. A commodity recommendation device comprising:
a processor; and
a memory storing program instructions that cause the processor to
obtain a behavior record of plural users regarding plural commodities;

determine a commodity feature vector in a predetermined commodity feature space of each of the plural commodities;
acquire a commodity feature matrix consisting of the determined commodity feature vectors of the plural commodities;
calculate a preference score each of the plural users regarding each of the plural commodities based on a sub behavior record of each user regarding each of the plural commodities;
obtain a score matrix composed of the preference scores of the plural users regarding the plural commodities;
determine a user feature vector for each of the plural users in respective predetermined commodity feature space for each of the plural commodities based on a regularized least squares based solution of a difference function of the score matrix and a prediction matrix, the prediction matrix being an inner product of a user feature matrix and the commodity feature matrix, the user feature matrix being made up of the user feature vectors of the plural users; and
display the results of the determined user feature vector, based on the determined user feature vectors of the plural users in the respective predetermined commodity feature spaces, on a display unit of a processing apparatus to a user of the processing apparatus as one or more recommended commodities from among the plural commodities, wherein
the behavior record includes at least one of a behavior occurrence time, a behavior occurrence type, and a behavior occurrence place for each behavior included in the behavior record;
the behavior occurrence time, the behavior type, and the behavior occurrence place of each behavior is respectively assigned a weight, the weight including at least
a time weight, which is negatively correlated with an interval between a behavior occurrence time and a predetermined reference time, and
a priority weight, which is a value that is assigned in accordance with a priority given to the at least one of the behavior occurrence time, the behavior type, and the behavior occurrence place, the value being larger for a higher priority and smaller for a lower priority.

10. The commodity recommendation device according to claim 9, wherein the program instructions further cause the processor to
analyze the sub behavior record for each of the plural users regarding each of the plural commodities;
obtain the behavior occurrence time, the behavior type, and the behavior occurrence place of each behavior of the corresponding user regarding each of the plural commodities, based on the analyzed sub behavior record for each of the plural users;
calculate a score of the corresponding behavior relating to each of the plural commodities for each behavior based on the behavior occurrence time, the behavior type, and the behavior occurrence place of the corresponding behavior;
sum up the scores of the behaviors for each of the plural commodities; and
obtain the preference score of the corresponding user regarding the corresponding commodity based on the summed up scores of the behaviors for each of the plural commodities.

11. The commodity recommendation device according to claim 9, wherein,
a user feature vector of an i-th user in its related predetermined commodity feature space is expressed using the following equation, for the score matrix in which values for one or more elements are unknown:

$$\hat{u}_i = \left(\sum_{j \in \Phi_i} v_j v_j^T + \lambda_u I\right)^{-1} \sum_{j \in \Phi_i} v_j r_{ij},$$

where $\hat{u}_i$ refers to the user feature vector of the i-th user; $v_j$ means the commodity feature vector of the j-th commodity; $\lambda_u$ denotes a predetermined regular term related weight; I indicates an identity matrix; $r_{ij}$ presents the preference score of the i-th user regarding the j-th commodity; and $\Phi_i$ stands for a set of commodities regarding which the preference scores of the i-th user in the score matrix are known.

12. The commodity recommendation device according to claim 9, wherein,
the user feature vectors are determined for the commodity feature matrix that includes at least one commodity feature vector in which values of one or more elements are unknown by
randomly generating values of the one or more elements in the commodity feature matrix based on all possible value combinations of the one or more elements to thereby acquire one or more candidate commodity feature matrices;
solving a difference function of the score matrix and a candidate prediction matrix for each candidate commodity feature matrix using regularized least squares, the candidate prediction matrix being an inner product of the corresponding candidate commodity feature matrix and the user feature matrix, to find a candidate commodity feature matrix, by which the solution of the difference function is minimum, the found candidate commodity feature matrix serving as a target commodity feature matrix; and
determine estimated values of the one or more elements of the at least one commodity feature vector in the commodity feature matrix based on values of all elements in the target commodity feature matrix; and
obtain the user feature vectors of the plural users in the respective predetermined commodity feature spaces based on the regularized least squares based solution corresponding to the target commodity feature matrix.

* * * * *